(12) United States Patent
Boulanger et al.

(10) Patent No.: US 11,374,438 B2
(45) Date of Patent: Jun. 28, 2022

(54) APPARATUS AND METHOD FOR RECEIVING WIRELESS POWER AT A FIRST FREQUENCY AND TRANSMITTING WIRELESS POWER AT A SECOND FREQUENCY

(71) Applicant: Quaze Technologies Inc., Montréal (CA)

(72) Inventors: Philippe Boulanger, Montréal (CA); Xavier Bidaut, Montréal (CA)

( * ) Notice: Subject to any disclaimer, the term of this patent is extended or adjusted under 35 U.S.C. 154(b) by 0 days.

(21) Appl. No.: 16/764,586

(22) PCT Filed: Nov. 15, 2018

(86) PCT No.: PCT/CA2018/051451
§ 371 (c)(1),
(2) Date: May 15, 2020

(87) PCT Pub. No.: WO2019/095063
PCT Pub. Date: May 23, 2019

(65) Prior Publication Data
US 2020/0389058 A1 Dec. 10, 2020

Related U.S. Application Data

(60) Provisional application No. 62/587,152, filed on Nov. 16, 2017.

(51) Int. Cl.
*H02J 50/70* (2016.01)
*H02J 50/80* (2016.01)
*H02J 50/12* (2016.01)
*H02J 50/40* (2016.01)
*H02J 50/00* (2016.01)
(Continued)

(52) U.S. Cl.
CPC ............. *H02J 50/70* (2016.02); *G06F 1/266* (2013.01); *H02J 7/02* (2013.01); *H02J 50/005* (2020.01); *H02J 50/12* (2016.02); *H02J 50/40* (2016.02); *H02J 50/80* (2016.02)

(58) Field of Classification Search
CPC .................................. H02J 50/00; H04B 5/00
See application file for complete search history.

(56) References Cited

U.S. PATENT DOCUMENTS

| 2012/0242447 A1* | 9/2012 | Ichikawa | ............... B60L 11/182 336/840 |
| 2013/0088089 A1* | 4/2013 | Leem | ................... H04B 5/0037 307/104 |

(Continued)

OTHER PUBLICATIONS

International application No. PCT/CA2018/051451 International Search Report dated Feb. 13, 2019.

(Continued)

*Primary Examiner* — Adi Amrany
(74) *Attorney, Agent, or Firm* — Anglehart et al.

(57) ABSTRACT

A wireless power adapter. It has a loosely coupled wireless power receiver adapted to receive wireless power at a first frequency and for providing a direct current power output. It has a tightly coupled wireless power transmitter connected to said direct current power output and adapted to transmit wireless power at a second frequency once direct current power is provided by said loosely coupled wireless power receiver.

18 Claims, 12 Drawing Sheets

(51) Int. Cl.
 *G06F 1/26* (2006.01)
 *H02J 7/02* (2016.01)

(56) References Cited

U.S. PATENT DOCUMENTS

| | | | | |
|---|---|---|---|---|
| 2014/0340080 | A1* | 11/2014 | Amin | G01S 13/767 |
| | | | | 324/207.16 |
| 2015/0048790 | A1* | 2/2015 | Rudser | A61N 1/3787 |
| | | | | 320/108 |
| 2015/0229134 | A1* | 8/2015 | Masaoka | H02J 50/80 |
| | | | | 307/104 |
| 2015/0380972 | A1* | 12/2015 | Fort | A61N 1/36038 |
| | | | | 320/108 |
| 2016/0006484 | A1 | 1/2016 | Swaans et al. | |
| 2016/0056664 | A1* | 2/2016 | Partovi | B60L 53/122 |
| | | | | 307/104 |
| 2016/0276840 | A1* | 9/2016 | Oto | H02J 50/40 |
| 2017/0264141 | A1 | 9/2017 | Novak | |
| 2017/0288474 | A1* | 10/2017 | Sakata | H04B 5/02 |
| 2019/0081515 | A1* | 3/2019 | Gajiwala | H01F 38/14 |

OTHER PUBLICATIONS

International application No. PCT/CA2018/051451 Search Strategy dated Feb. 13, 2019.
International application No. PCT/CA2018/051451 Written Opinion of the International Searching Authority dated Feb. 13, 2019.

\* cited by examiner

APPARATUS AND METHOD FOR RECEIVING WIRELESS POWER AT A FIRST FREQUENCY AND TRANSMITTING WIRELESS POWER AT A SECOND FREQUENCY

The present patent application claims priority from U.S. provisional patent application No. 62/587,152 filed on Nov. 16, 2017.

TECHNICAL FIELD

The present application relates to wireless power transfer devices for powering an electronic device, and more particularly wireless power adapters.

BACKGROUND

Certain computing devices are configured to be sensitive to a specific open interface standard that defines wireless power transfer. One such standard is the QI standard that uses inductive charging.

The QI standard, as implemented in numerous devices such as telephones and Qi chargers, requires the receiver and transmitter antennas to be precisely aligned and separated by an extremely short air gap, (typically a few millimeters) practically imposing that the receiving and chargers are in contact with each other and that the receiver is positioned within a few millimeters respective to the charger.

On the other hand, alternative standards overcome some of the main limitation of the Qi standard. As an example, the AirFuel™ standard, which is based on resonant inductive power transfer, allows power transmission over a longer distance, up to several centimeters, and also allowing non-conductive material, in thickness of several centimetres, to be placed between the transmitter and the receiver. Moreover, the AirFuel™ standard does not require precise alignment of the receiver and transmitter antennas.

Several manufacturers of computing devices (e.g. smartphones and tablets) have adapted their devices to be receptive to the QI standard. However, such devices may not be receptive to other standards of wireless power transfer, such as AirFuel™.

Moreover, the nature of the QI wireless power transfer makes the charging sensitive to positioning of the transmitting antenna versus the receiving antenna, where a sub-optimal positioning may impact the quality and efficiency of the wireless power transfer. Additionally, the nature of QI wireless power transfer is such that the receiving antenna and the transmitting antenna are to be in close proximity as wireless power transfer defined by the QI standard is capable of covering only short distances. As such, a user with a device configured to the QI standard is constrained by the limitations of the QI standard in terms of wireless powering. Additionally, the user is limited to use the QI standard as a result of the provided configurations of the computing device, not compatible with other wireless power transfer standards.

SUMMARY

As a result, it would be advantageous to provide for a mechanism to allow for computing devices adapted to the QI standard to be able to obtain wireless power from power sources operating on another standard of wireless power transfer, such as AirFuel™.

As such, the present application relates to a wireless power adapter that is adapted to receive power wirelessly corresponding to a first interface standard (e.g. at a first frequency (e.g. a frequency corresponding to the AirFuel™ wireless standard)), and transmit power wirelessly corresponding to a second interface standard (e.g. at a second frequency (e.g. at the frequency corresponding to the QI standard)).

The wireless power adapter may be used with a computing device configured to receive wireless power of a given standard, such that the computing device, once used in combination with the wireless power adapter, is adapted to receive wireless power that has been transmitted from, e.g., a power source at a different standard of wireless power transfer.

A first broad aspect is a wireless power adapter including a loosely coupled wireless power receiver adapted to receive wireless power at a first frequency and for providing a direct current power output. The adapter also includes a tightly coupled wireless power transmitter connected to the direct current power output and adapted to transmit wireless power at a second frequency once direct current power is provided by the loosely coupled wireless power receiver.

In some embodiments, the adapter may include an electromagnetic shield adapted to reduce interference between the loosely coupled wireless power receiver and the tightly coupled wireless power transmitter.

In some embodiments, the adapter may also include a tightly coupled wireless power receiver adapted to receive wireless power at the second frequency and for providing an additional current power output. The tightly coupled wireless power transmitter may be further adapted to receive current power from the loosely coupled wireless power receiver and the tightly coupled wireless power receiver. The electromagnetic shield may be further adapted to reduce interference between the tightly coupled wireless power receiver and the tightly coupled wireless power transmitter.

In some embodiments, the tightly coupled wireless power receiver may be adapted to provide an additional direct current power output, and the tightly coupled wireless power transmitter may be further adapted to receive direct current power from the loosely coupled wireless power receiver.

In some embodiments, the tightly coupled wireless power transmitter may be further configured to be connected to the additional current power output.

In some embodiments, the connection between the tightly coupled wireless power transmitter and the tightly coupled wireless power receiver may be in parallel with the connection to the loosely coupled wireless receiver power output (e.g. through diodes).

In some embodiments, the electromagnetic shield may have a first sub-shield adapted to reduce interference between the loosely coupled wireless power receiver and the tightly coupled wireless power transmitter, and a second sub-shield adapted to reduce interference between the tightly coupled wireless power receiver and the tightly coupled wireless power transmitter.

In some embodiments, the tightly coupled wireless power receiver may be an inductive wireless power receiver.

In some embodiments, the tightly coupled wireless power receiver and the loosely coupled wireless power receiver may be printed on a substrate.

In some embodiments, the adapter may include electromagnetic filter components printed on a substrate.

In some embodiments, loosely coupled wireless power receiver may be a resonant wireless power receiver.

In some embodiments, the tightly coupled wireless power transmitter may be an inductive wireless power transmitter.

In some embodiments, the adapter may include a power storage unit connected to at least the loosely coupled wireless power receiver for receiving power from at least the loosely coupled wireless power receiver, and connected to the tightly coupled wireless power transmitter for delivering power to the tightly coupled wireless power transmitter.

In some embodiments, the power storage unit may be configured to receive current in parallel with the tightly coupled wireless power transmitter, the current provided by at least the loosely coupled wireless power receiver.

In some embodiments, the power storage unit may be a battery.

In some embodiments, the adapter may also include a housing for receiving at least the loosely coupled wireless power receiver, the tightly coupled wireless power transmitter and the electromagnetic shield.

In some embodiments, the adapter may also include a housing for receiving at least the loosely coupled wireless power receiver and the tightly coupled wireless power transmitter.

In some embodiments, the housing may include a connector for attaching the housing to a surface of a computing device.

In some embodiments, the connector may be an adhesive on at least a part of one surface of the housing.

In some embodiments, the connector may be a clip, an adhesive, an electromagnet and/or a magnet.

In some embodiments, the adapter may be incorporated into a casing for receiving a computing device.

A second broad aspect is in combination a computing device and a wireless power adapter. The computing device includes a computing device housing and a tightly coupled wireless power receiver for receiving wireless power at a second frequency and outputting current for powering the computing device. The wireless power adapter includes a wireless power adapter housing. The adapter also includes a loosely coupled wireless power receiver adapted to receive wireless power at a first frequency and for providing a direct current power output. The adapter also includes a tightly coupled wireless power transmitter connected to the direct current power output and adapted to transmit wireless power at a second frequency once direct current power is provided by at least the loosely coupled wireless power receiver. The adapter also includes an electromagnetic shield adapted to reduce interference between the loosely coupled wireless power receiver and the tightly coupled wireless power transmitter; wherein the housing of the wireless power adapter is adapted to mate with the housing of the computing device.

In some embodiments, the housing of the wireless power adapter may include a connector for attaching the housing of the wireless power adapter to the housing of the computing device.

In some embodiments, the connector may be an adhesive on at least a part of one surface of the housing of the wireless power adapter.

In some embodiments, the wireless power adapter may include a tightly coupled wireless power receiver adapted to receive wireless power at the second frequency and for providing an additional direct current power output. The tightly coupled wireless power transmitter may be further adapted to receive direct current power from the loosely coupled wireless power receiver and the tightly coupled wireless power receiver. The electromagnetic shield may be further adapted to reduce interference between the tightly coupled wireless power receiver and the tightly coupled wireless power transmitter.

The tightly coupled wireless power transmitter may be further configured to be connected to the additional direct current power output.

In some embodiments, the connection between the tightly coupled wireless power transmitter and the tightly coupled wireless power receiver may be in parallel with the connection to the loosely coupled wireless receiver power output (e.g. through diodes).

In some embodiments, the tightly coupled wireless power receiver and the loosely coupled wireless power receiver may be printed on a substrate.

In some embodiments, the wireless power adapter may include a power storage unit connected to at least the loosely coupled wireless power receiver for receiving power from at least the loosely coupled wireless power receiver, and connected to the tightly coupled wireless power transmitter for delivering power to the tightly coupled wireless power transmitter.

A third broad aspect is a method for powering wirelessly a computing device, wherein the wireless power receiver of the computing device is a tightly coupled wireless power receiver for receiving power at a second frequency, and wherein wireless power transmitted from a power source is transmitted at a first frequency. The method includes receiving the wireless power at the first frequency via a loose coupling and converting the wireless power at the first frequency into direct current. The method also includes converting the direct current into alternating current for transmission as wireless power at the second frequency. The method also includes transmitting the wireless power via a tight coupling at the second frequency, whereby the wireless power at the second frequency is received via the tight coupling by the wireless power receiver of the computing device.

A fourth broad aspect is a method of adapting a computing device, the computing device comprising a tightly coupled wireless power receiver adapted to receive wireless power at a second frequency via a tight coupling, to be powered by wireless power received at a first frequency. The method includes connecting a wireless power adapter to a surface of a housing of the computing device, the wireless power adapter including a housing; a loosely coupled wireless power receiver adapted to receive wireless power at the first frequency and for providing a direct current power output; a tightly coupled wireless power transmitter connected to the direct current power output and adapted to transmit wireless power at the second frequency once direct current power is provided by at least the loosely coupled wireless power receiver; and an electromagnetic shield adapted to reduce interference between the loosely coupled wireless power receiver and the tightly coupled wireless power transmitter. The housing of the wireless power adapter is connected to the surface of the housing of the computing device such that the tightly coupled wireless power transmitter of the wireless power adapter is in proximity to the tightly coupled wireless power receiver of the computing device.

In some embodiments, the connecting may include adhering the housing of the wireless power adapter to a surface of a housing of the computing device.

A fifth broad aspect is a wireless power adapter including a wireless power receiver adapted to receive wireless power corresponding to a first interface standard and for providing a current power output. The adapter also includes a wireless power transmitter connected to the current power output and adapted to transmit wireless power corresponding to a second interface standard once current power is provided by the wireless power receiver.

In some embodiments, the wireless power receiver may be a loosely coupled wireless power receiver for providing direct current power output, and the wireless power transmitter may be a tightly coupled wireless power transmitter that may be connected to the direct current power output, and wherein the first interface standard may be associated to wireless power at a first frequency and the second interface standard may be associated to wireless power transmitted at a second frequency.

In some embodiments, the adapter may include an electromagnetic shield adapted to reduce interference between the loosely coupled wireless power receiver and the tightly coupled wireless power transmitter.

In some embodiments, the first interface standard may be associated to wireless power in a first propagation form and the second interface standard may be associated to wireless power transmitted in a second propagation form; and/or the first interface standard may be associated to a first communication protocol and the second interface standard may be associated to a second communication protocol.

A sixth broad aspect is a wireless power adapter including a loosely coupled wireless power receiver adapted to receive wireless power at a first frequency and for providing a direct current power output. The adapter also includes a tightly coupled wireless power transmitter connected to the direct current power output and adapted to transmit wireless power at a second frequency once direct current power is provided by the loosely coupled wireless power receiver.

BRIEF DESCRIPTION OF THE DRAWINGS

The invention will be better understood by way of the following detailed description of embodiments of the invention with reference to the appended drawings, in which.

DETAILED DESCRIPTION

The present application relates to a wireless power adapter for obtaining wireless power at a first frequency and transmitting wireless power at a second frequency, where the wireless power receiver of a computing device is adapted to receive wireless power at the second frequency (e.g. a frequency corresponding to a specific standard of wireless power transfer).

In the present application, by "computing device", it is meant a device that requires electric power to run, such as, but not limited to, a computer, a tablet, a laptop, a smartphone, a smartwatch, a lamp, an alarm clock, an interactive voice command processing unit, a wireless display, etc.

In the present application, by "propagation form" it is meant the mechanism or form used to wirelessly transfer energy, such as by electromagnetic waves (e.g. light harvesting, radio frequency harvesting, etc.), ultrasonic waves, etc.

"Standard" and "interface standard" are used interchangeably herein. A "standard" or "interface standard" describes one or more functional characteristics (e.g. protocol compliance) or physical characteristics (e.g. electrical, mechanical or optical characteristics), operational characteristics, levels of performance, etc., necessary to allow the exchange of information and/or power between two or more systems or pieces of equipment. The standard or interface standard may be associated to the propagation form of the wireless power, the frequency of the wireless power, etc.

Figure 1A:
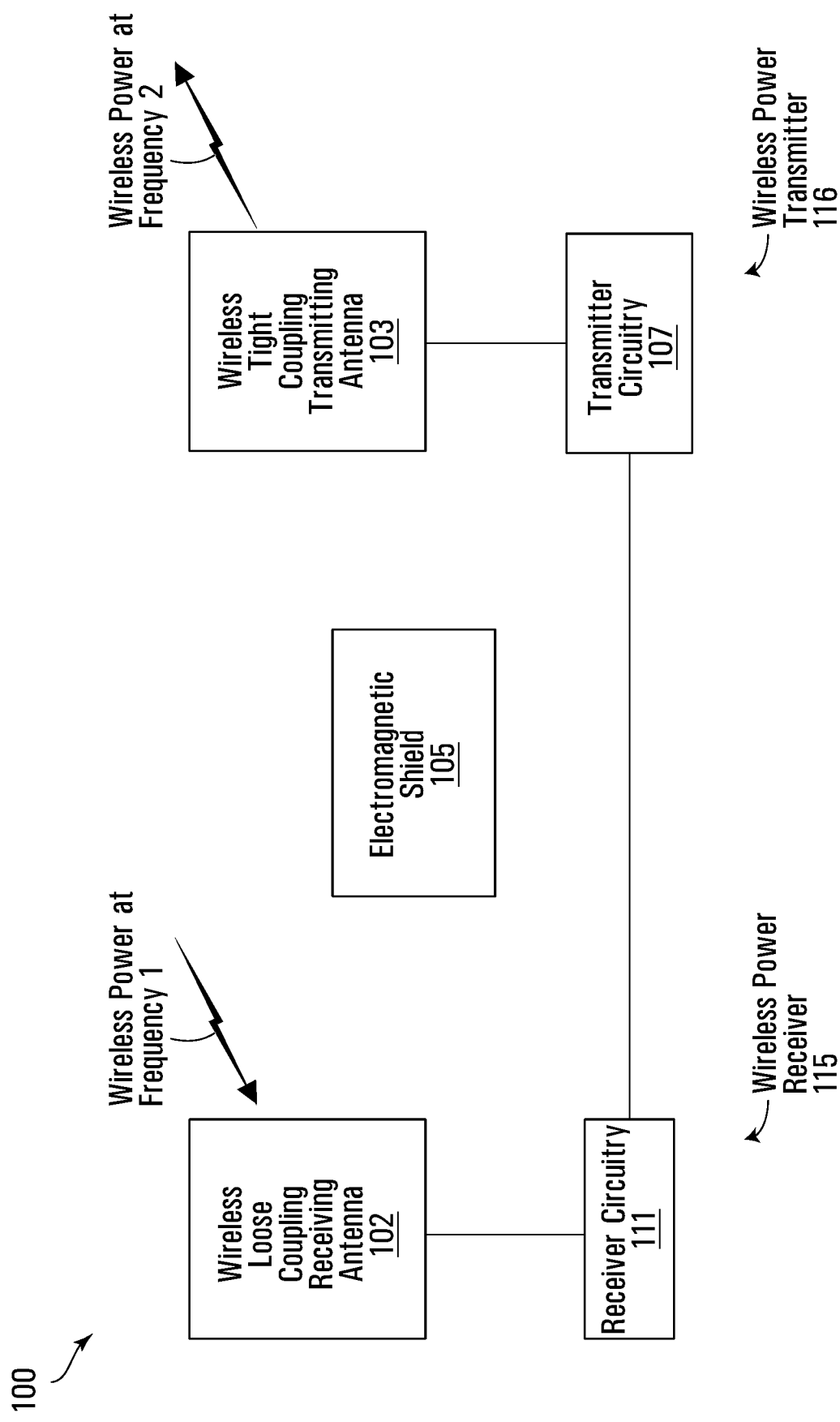
FIG. 1A is a block diagram of an exemplary wireless power adapter.
Figure 1B:
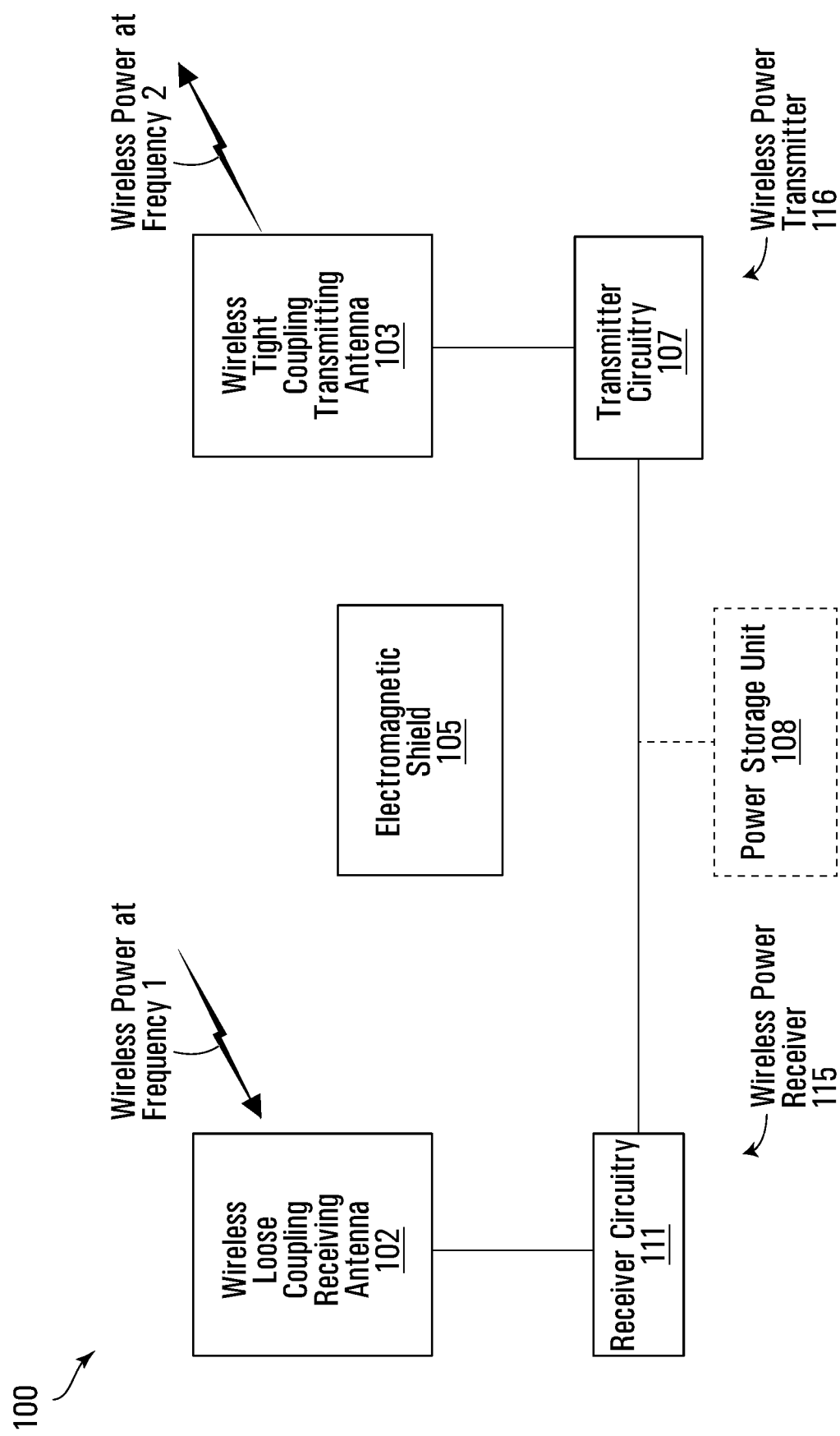
FIG. 1B is a block diagram of an exemplary wireless power adapter having a power storage unit.

Reference is made to FIG. 1, illustrating an exemplary wireless power adapter 100. The wireless power adapter 100 includes a wireless power receiver 115 (e.g. including a wireless power receiving antenna 102 and its receiver circuitry 111), a wireless power transmitter 116 (e.g. including a wireless power transmitting antenna 103 and its transmitting circuitry 107). The wireless power adapter 100 may also have an electromagnetic shield 105. The wireless power adapter 100 may also have a power storage unit 108 as shown in FIG. 1B.

The wireless power receiving antenna 102 is an antenna for receiving wireless power at a first frequency. The receiving antenna 102 may be adapted by its receiver circuitry 111 to be sensitive to receive wireless power at the given first frequency. A skilled person will readily understand that the receiving antenna 102 may be further adapted or possess certain characteristics in order to be receptive to wireless power at the first frequency. In one example, the receiving antenna 102 includes a coil. In one example, the receiving antenna 102 generates alternating current from the wireless power received. In some examples, the antenna 102 and/or the antenna 103 may be a cable, etc.

The receiver circuitry 111 is a circuitry connected to the wireless power receiving antenna 102. The receiver circuitry 111, along with the wireless receiving antenna 102, form the wireless power receiver 115. The receiver circuitry 111 may be composed and configured as is known in the art to, along with the wireless power receiving antenna 102, receive wireless power at the first frequency and output direct current power. In some embodiments, the receiver circuitry 111 may have a rectifier for converting alternating current generated by the receiving antenna 102 into direct current.

In some embodiments, the wireless power receiver 115 may be configured to provide a loose coupling solution. Loose coupling may be associated with high frequency, where wireless power may be transmitted over longer distances. Therefore, in some examples, loose coupling may result in a significant portion of the influx missing the receiver antenna. An example of loose coupling is the technology corresponding to the AirFuel™ standard. In some examples, a loosely coupled wireless power receiver may be a resonant wireless power receiver. However, it will be understood that other forms of technology, other than resonant technology, may be used to achieve a loose coupling solution.

In some embodiments, the antenna 102 may be configured to be a dual-band wireless receiving antenna.

In some embodiments, the wireless power receiver 115 is for receiving wireless power corresponding to the AirFuel™ standard.

The wireless power transmitting antenna 103 is an antenna configured to transmit wireless power at a second frequency. In some examples, the wireless power transmitting antenna 103 may receive alternating current and transmit wireless power at a given frequency in accordance, e.g., with the frequency of the alternating current. In some embodiments, the wireless power transmitting antenna 103 is a coil.

In some embodiments, the wireless power transmitting antenna 103 is an inductive wireless power transmitting antenna. In some embodiments, the wireless power transmitter 116 is configured to transmit power at the Qi standard.

Figure 2A:
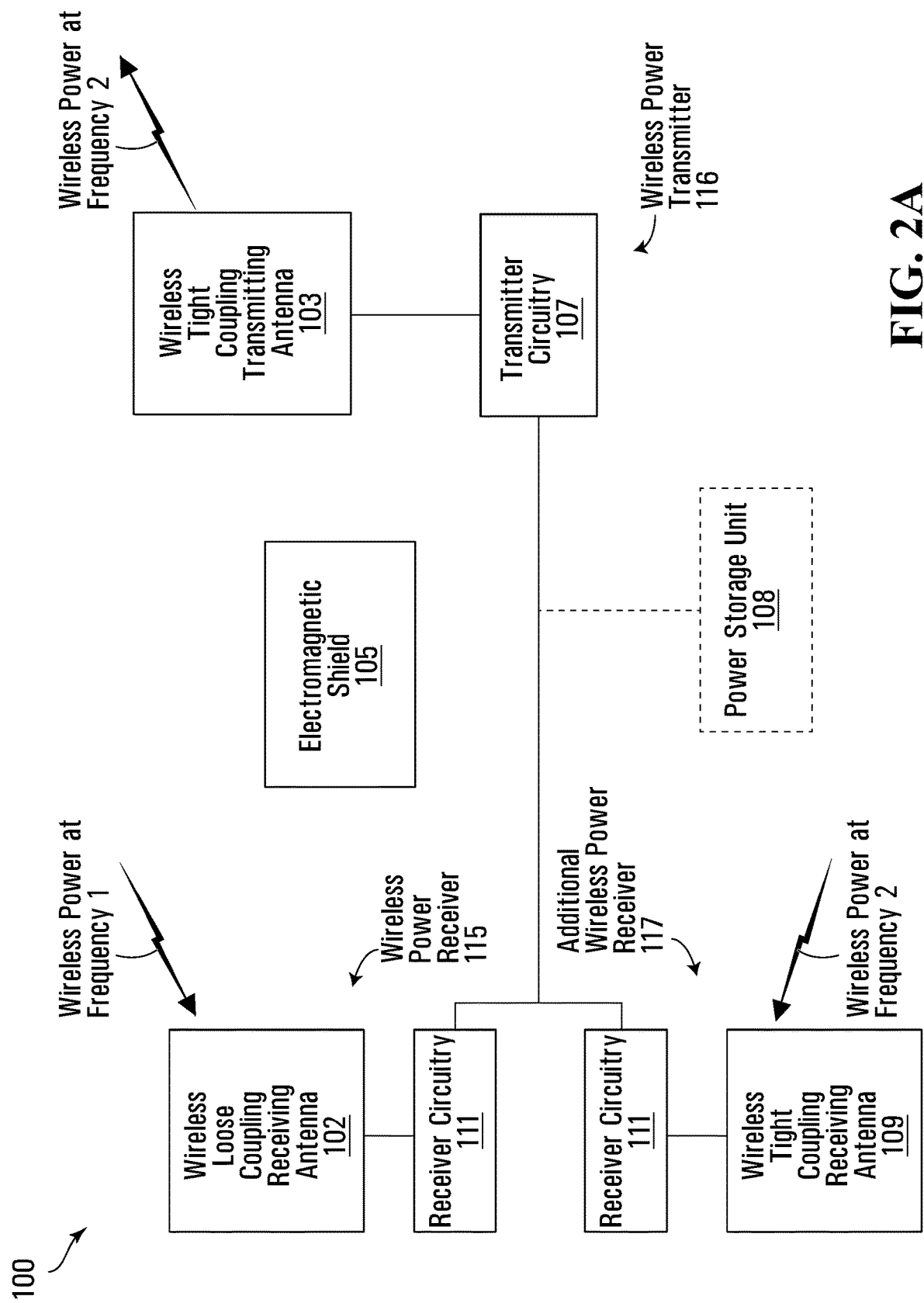
FIG. 2A is a block diagram of an exemplary wireless power adapter including an additional tightly-coupled wireless receiver for receiving wireless power inductively.

The transmitter circuitry 107 is connected to the wireless power transmitting antenna 103. The transmitter circuitry 107, along with the wireless transmitting antenna 103, form the wireless power transmitter 116. The transmitter circuitry 107 may be composed and configured as is known in the art to, along with the wireless power transmitting antenna 103, transmit wireless power at the second frequency from current received (e.g. from the wireless power receiver 115, another wireless power receiver such as wireless power receiver 117 as shown in FIG. 2A, the power storage unit 108, etc.). For instance, in some embodiments, the transmitter circuitry 107 may have an oscillator for converting direct current received from the wireless power receiver 115, another wireless power receiver such a wireless power receiver 117 as shown in FIG. 2A and/or the power storage unit 108, into alternating current (e.g. at a specific frequency).

In some embodiments, the wireless power transmitter 116 may be configured for a tight coupling solution. Tight coupling may be associated with low frequency, where wireless power may be transmitted over short distances. Therefore, in some examples, tight coupling technology may result in a coupling coefficient of around 1. An example of tight coupling is the technology corresponding to the Qi standard. In some examples, a tightly coupled wireless power transmitter may be an inductive wireless power transmitter. However, it will be understood that other forms of technology, other than inductive technology, may be used to achieve a tight coupling solution.

In some examples, the wireless power transmitter 116 may be tightly coupled in order to correspond to the tightly coupled wireless power receiver of the computing device that is to be powered.

In some examples, the receiver circuitry 111 and/or the transmitter circuitry 107 may be connected via a BUS (e.g. wiring, and/or cables, etc.). In some embodiments, the power storage unit 108 may also be connected via a BUS. In some embodiments, a receiver circuitry 118 may also be connected via a BUS. The wireless loose coupling receiving antenna 102 may be wired or have a cabled-connection to the receiver circuitry 111. The wireless tight coupling transmitting antenna 103 may be wired or have a cabled-connection to the transmitter circuitry 107. In some examples, the wireless tight coupling receiving antenna 109 may be wired or have a cabled-connection to the receiving circuitry 118.

In some embodiments, the wireless power adapter 100 may have a power storage unit 108 as shown in FIG. 1B. The power storage unit 108 may receive power from the wireless power receiver 115 and store the power. The power storage unit 108 may provide power to the wireless power transmitter 116.

In some examples, the power storage unit 108 may be connected in parallel with the wireless power transmitter 116 such that the power storage unit 108 receives current in parallel with the wireless power transmitter 116 from the wireless power receiver 115 (and, in some examples, the wireless power receiver 117).

As such, in some examples, where the computing device that requires powering consumes more power than what is received by the wireless power receiver 115, the power storage unit 108 may provide additional power, stored therein, to the wireless power transmitter 116 to generate wireless power for the computing device requiring power.

Similarly, at times where the computing device's power consumption drops, or when no computing device is being powered (e.g. at night, for instance, in an office space), the power received by the wireless power receiver 115 may be stored in the power storage unit 108 for future use.

In some embodiments, the wireless power transmitter 116 may be further configured such that its power input is connected to the direct current power output of the power storage unit 108 in parallel (e.g. through a discharge diode) with the direct current output of the wireless power receiver 115 and, in some examples, the wireless power receiver 117 direct current output.

In some embodiments, the power storage unit 108 may be a battery. In other examples, the power storage unit 108 may be a capacitor. It will be understood that the power storage unit 108 may be any device that can receive and store power for future use.

It will be understood that even though FIG. 1B shows there being one power storage unit 108, the wireless power adapter 100 may have multiple power storage units 108 (e.g. multiple batteries).

The electromagnetic shield 105 is configured to prevent interference between the wireless power receiver 115 (e.g. its wireless power receiving antenna 102) and the wireless power transmitter 116 (e.g. its wireless power transmitting antenna 103). In some examples, this is advantageous when the wireless power receiver 115 and the wireless power transmitter 116 are operating on the same or similar frequencies. In some examples, the electromagnetic shield 105 may be an EMI shield. For instance, the electromagnetic shield 105 may be made out of a ferromagnetic material, such as ferrite, for instance, providing little resistance to some frequencies of the electromagnetic waves and providing greater resistance to other frequencies of the electromagnetic waves. The electromagnetic shield 105 may prevent metal of the computing device (e.g. the metal casing of a smartphone or laptop) from interfering with the wireless power receiver 115. The electromagnetic shield 105 may also protect the computing device, and the wireless power receiver of the computing device, from interference and the electromagnetic field of the wireless power adapter. The electromagnetic shield 105 may increase the strength of the wireless power receiver 115, of the wireless power transmitter 116, the wireless power receiver 117 and/or the strength of the wireless power receiver of the computing device. In other examples, such as when the wireless power receiver 115 and the wireless power receiver 117 form part of a circuit board e.g. printed on a substrate, the shield 105 may be a filter, e.g. electromagnetic filter components that are on the circuitry to reduce interference.

However, in other examples, there may not be an electromagnetic shield 105.

Additional Wireless Power Receiver:

Reference is now made to FIG. 2A, illustrating an exemplary wireless power adaptor 100. The wireless power adaptor 100 includes a second wireless power receiver 117. The second wireless power receiver 117 may have an inductive wireless power receiving antenna 109 connected to receiver circuitry 118. The second wireless power receiver 117 is for receiving wireless power at a second frequency (i.e. the same, or similar frequency, to the one transmitted by the wireless power transmitter 116).

As such, the wireless power transmitter 116 may also receive the current produced by the second wireless power receiver 117. The wireless power transmitter 116 may then generate wireless power as it receives power from the wireless power receiver 115 and/or the wireless power receiver 117 (and/or, in some examples, the power storage unit 108). In some embodiments, as the second wireless power receiver 117 and the wireless power transmitter 116 operate at the same second frequency, the current produced by the second wireless power receiver 117 may be sent directly to the wireless power transmitting antenna 103 without there being an AC/DC conversion followed by a DC/AC conversion.

In some examples, the wireless power receiver 117 may be adapted to receive wireless power at a third frequency. In these examples, the wireless power at the third frequency may be converted from alternating current to direct current (and in some examples, added to the direct current produced by the first wireless power receiver 115), and then reconverted into alternating current by the transmitter circuitry 107 of the wireless power transmitter 116 for producing wireless power at the second frequency.

The receiver circuitry 118 is circuitry connected to the wireless power receiving antenna 109. The receiver circuitry 118, along with the wireless receiving antenna 109, form the wireless power receiver 117. The receiver circuitry 118 may be composed and configured as is known in the art to, along with the wireless power receiving antenna 109, receive wireless power at the second frequency and output direct current power. In some embodiments, the direct current power outputted by the wireless power receiver 117 may merge with the direct current power outputted by the wireless power receiver 115.

In some embodiments, the receiver circuitry 118 may have a rectifier for converting alternating current generated by the receiving antenna 109 into direct current.

In some embodiments, the wireless power receiver 117 may be configured for a tight coupling solution. An example of tight coupling technology corresponds to the Qi standard. In some examples, a tightly coupled wireless power receiver may be an inductive wireless power receiver. However, it will be understood that other forms of technology, other than inductive technology, may be used to achieve a tight coupling solution.

For instance, the wireless power adapter 100 may be configured to receive power in two different frequencies. For example, the wireless power adapter 100 may be receiving power at a frequency corresponding with the AirFuel™ standard, but may also be configured to receive wireless power at the QI standard. As such, the wireless loosely coupled receiver 115 is receptive to the wireless power at the frequency of the AirFuel™ standard, where the tightly coupled wireless power receiver 117 is receptive to the wireless power at the frequency of the QI standard. The wireless power adapter 100 may then output wireless power, via its tightly coupled wireless power transmitter 116, at a frequency corresponding to the QI standard.

The electromagnetic shield 105 may additionally reduce or prevent interference between the wireless power receiver 117 and the wireless power transmitter 116 (as, in some examples, the wireless power receiver 117 and the wireless power transmitter 116 may be operating at similar or the same frequency).

Figure 2B:
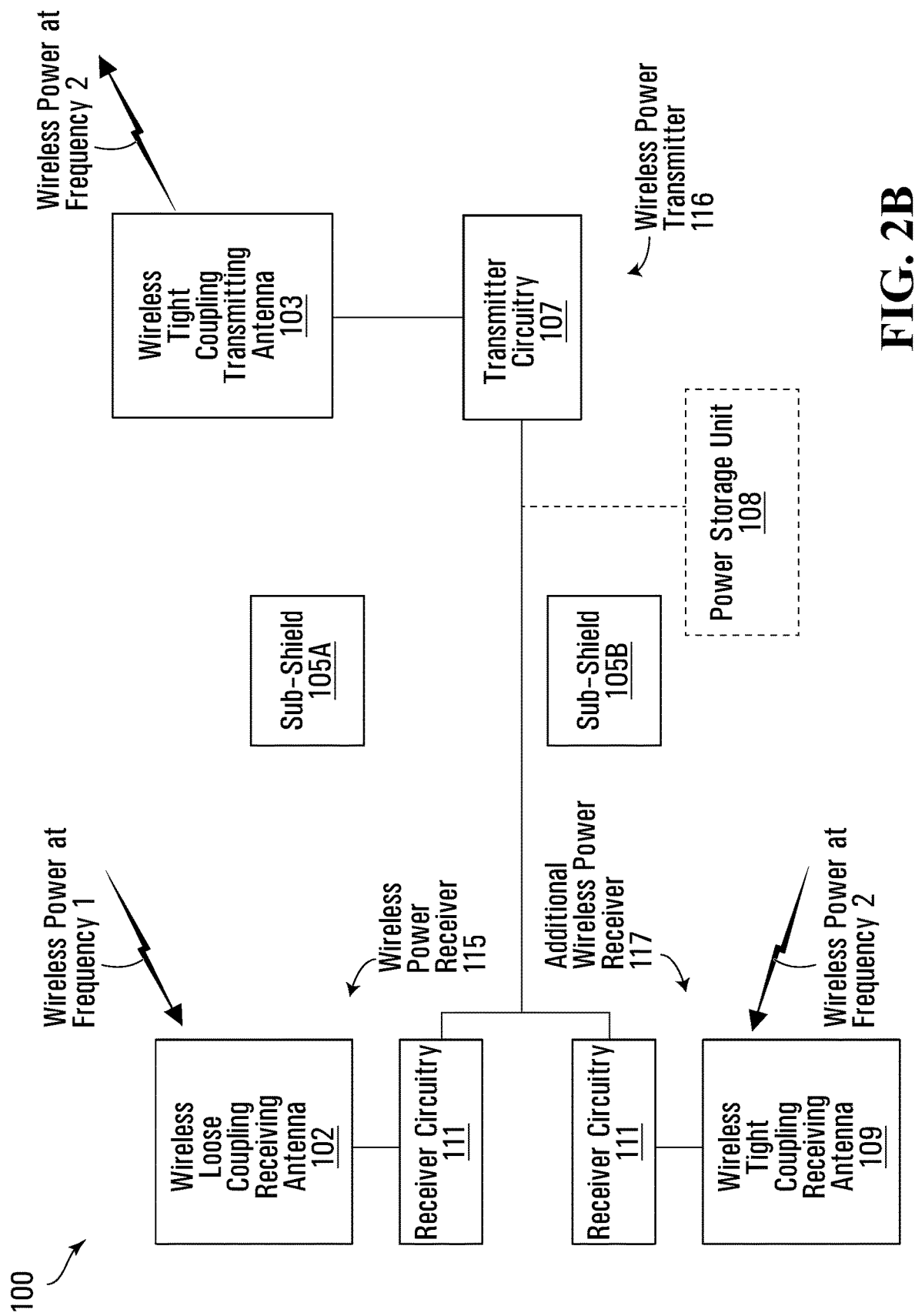
FIG. 2B is a block diagram of an exemplary wireless power adapter including an additional tightly-coupled wireless receiver for receiving wireless power inductively and two sub-shields.

In some examples, the electromagnetic shield 105 may be further composed as two or more sub-shields (e.g. as shown in FIG. 2B, a first sub-shield 105A to reduce or prevent interference between the wireless power receiver 115 and the wireless power transmitter 116; and a second sub-shield 105B to reduce or prevent interference between the wireless power receiver 117 and the wireless power transmitter 116). In some embodiments, a third sub-shield (not shown) may be present to reduce interference between the wireless power receiver 115 and the additional wireless power receiver 117.

Figure 3A:
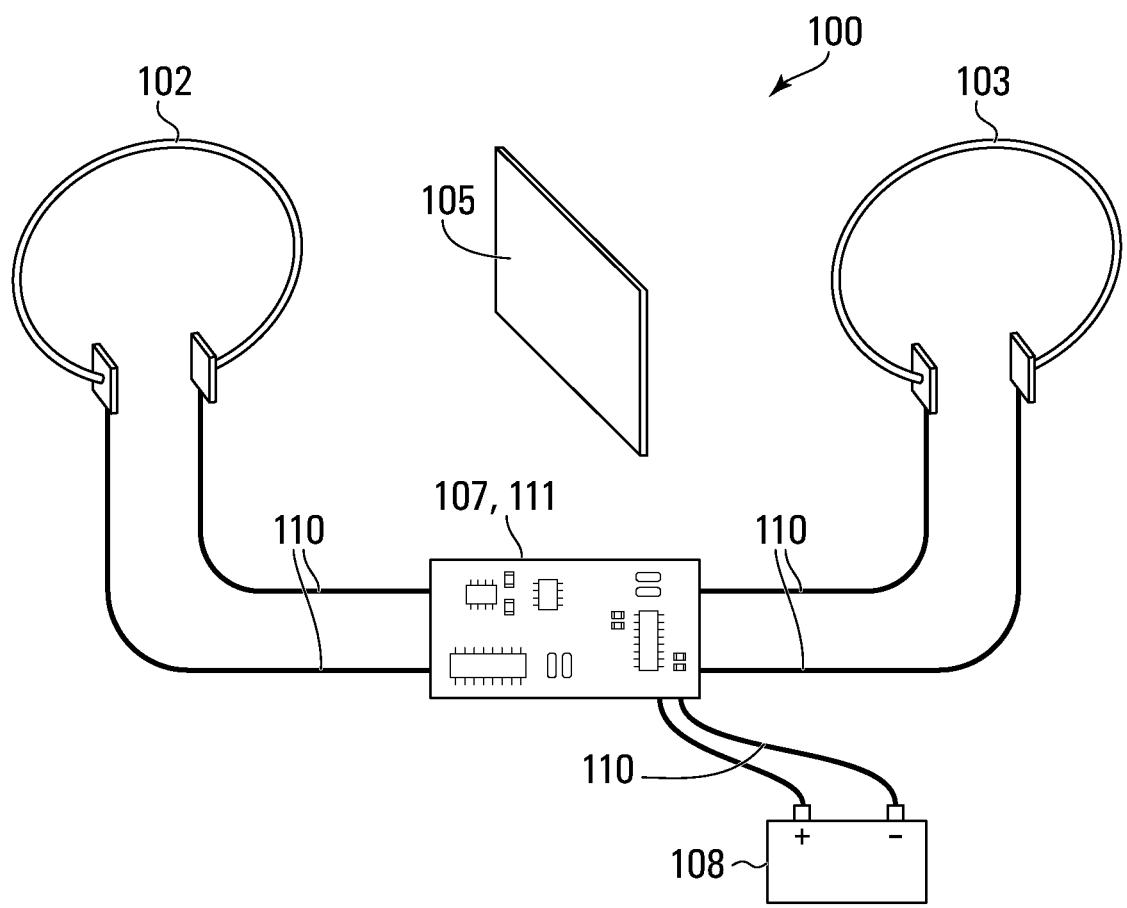
FIG. 3A is a schematic drawing of components of an exemplary wireless power adapter.
Figure 3B:
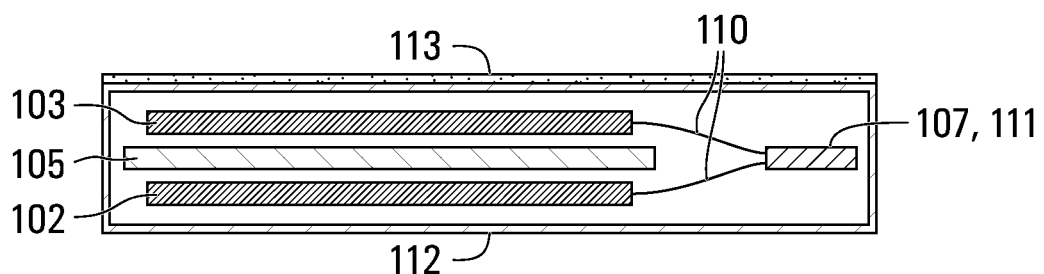
FIG. 3B is a schematic drawing of a cross-sectional view of an exemplary wireless power adapter.

Reference is now made to FIGS. 3A and 3B, illustrating an exemplary wireless power adapter 100. In some examples, the wireless power receiving antenna 102 may be connected to its receiver circuitry 111 using, e.g., wires or cables 110. Similarly, the wireless power transmitting antenna 103 may be connected to its transmitter circuitry 107 through, e.g., wires or cables 110. The power storage unit 108 may also be connected through, e.g., wires or cables 110. As shown in FIG. 3A, the receiver circuitry 111 and the transmitter circuitry 107 may be present on a single circuit board. However, it will be understood that, in some examples, the receiver circuitry 111 and the transmitter circuitry 107 may be present on different circuit boards.

The shield 105 may be placed between the wireless power receiving antenna 102 and the wireless power transmitting antenna 103 so as to reduce interference between the wireless power receiving antenna 102 and the wireless power transmitting antenna 103.

As shown in FIG. 3B, both the wireless power receiving antenna 102 and the wireless power transmitting antenna 103 may be placed in close proximity so as to reduce the thickness of the wireless power adapter 100. The wireless power receiving antenna 102 and the wireless power transmitting antenna 103 are shown in FIG. 3B to be in parallel with the shield 105, the shield 105 sandwiched between the wireless power receiving antenna 102 and the wireless power transmitting antenna 103. The shield 105 of FIG. 3B is shown to be planar, defined within a plane.

The wireless power adapter 100 may also have a housing 112 to receive, for instance, receiver circuitry 111, transmitter circuitry 107, the wireless power receiving antenna 102, the wireless power transmitting antenna 103, the power storage unit 108, the wiring or cables 110, the shield 102 and/or any of the other components of the wireless power adapter 100. The components of the wireless power adapter 100 may be disposed on surface(s) of the housing 112, or within the housing 112. It will be understood that in some examples, some of the components may be present on surface(s) of the housing 112, where other components may be disposed in the housing 112. The housing 112 may be made out of, e.g., plastic, cardboard, wood, a textile, leather, etc. The housing 112 may be in the shape of a pad, the top flat portion of a table, a thin sleeve, a card, etc.

In some embodiments, the housing 112 may have a connector 113 for connecting the wireless power adapter 100 to the computing device to be wirelessly powered (e.g. the housing of the computing device). By connecting the wireless power adapter 100 to the computing device, it will be understood that it may be that the wireless power adapter 100 may be connected to a casing of the computing device (e.g. the casing of the smartphone or the casing of the tablet).

In some embodiments, the connector 113 may be an adhesive, the adhesive present on at least a part of one surface of the housing of the wireless power adaptor 100 to adhere to the computing device (or a housing of the computing device). In other embodiments, the connector 113 may be a clip, connected, for instance, to the housing of the wireless power adaptor 100, adapted to clip onto the housing of the computing device (e.g. clip onto the sides of a smartphone). In some examples, the connector 113 may also connect to the computing device using suction, a magnet, electromagnet, etc.

Figure 4:
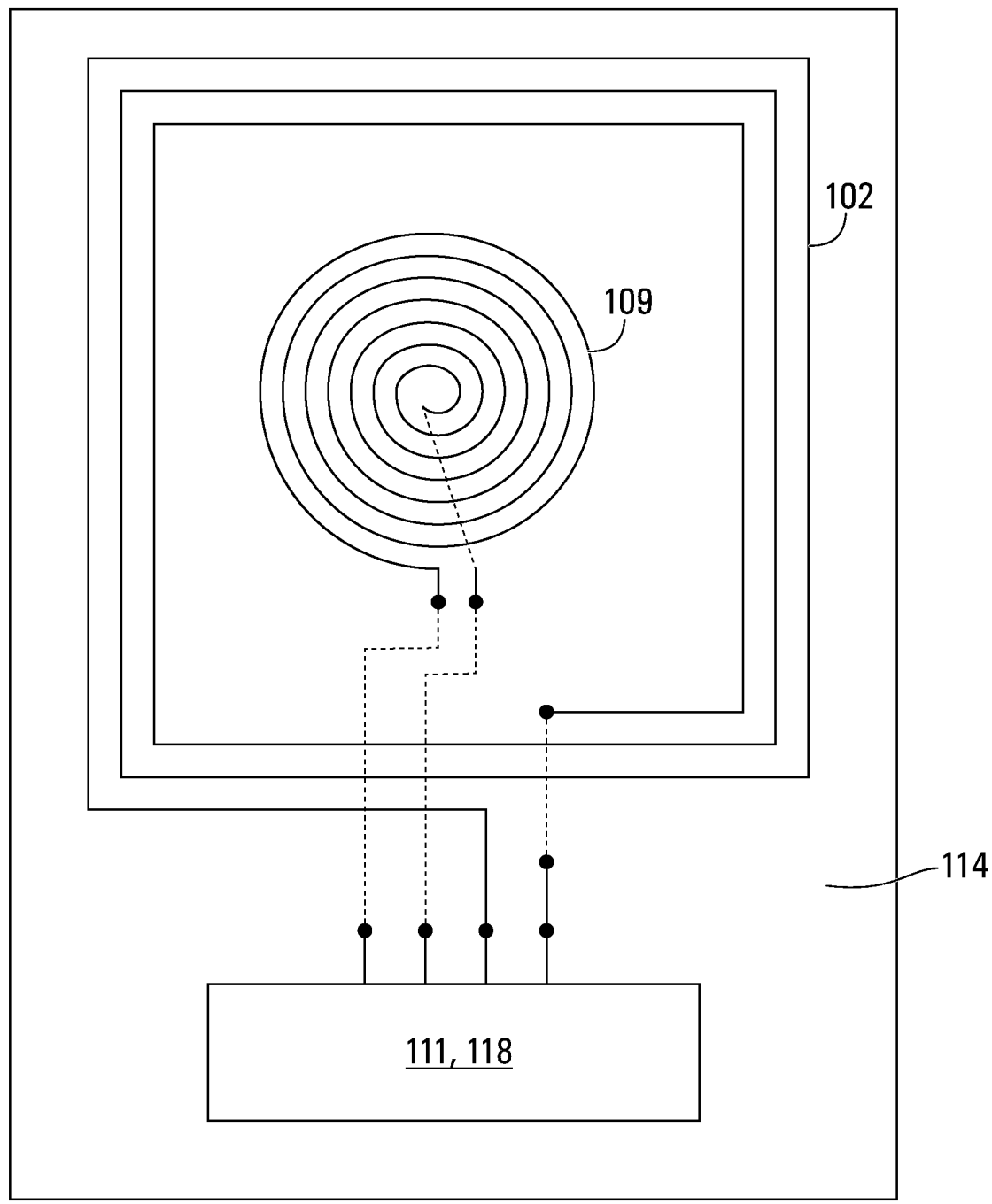
FIG. 4 is a schematic drawing of a top-down view of an exemplary wireless power adapter arranged on a circuit board or other flat support medium.

As shown in FIG. 4, the wireless power adaptor 100 may have its components mounted onto a board (e.g. printed on a substrate) or, e.g., a planar support medium 114. The shield 105 may be or may include filter components that are on the circuitry to reduce interference between the wireless power receiver 115 (and/or the wireless power receiver 117) and the wireless power transmitter 116.

Figure 5:
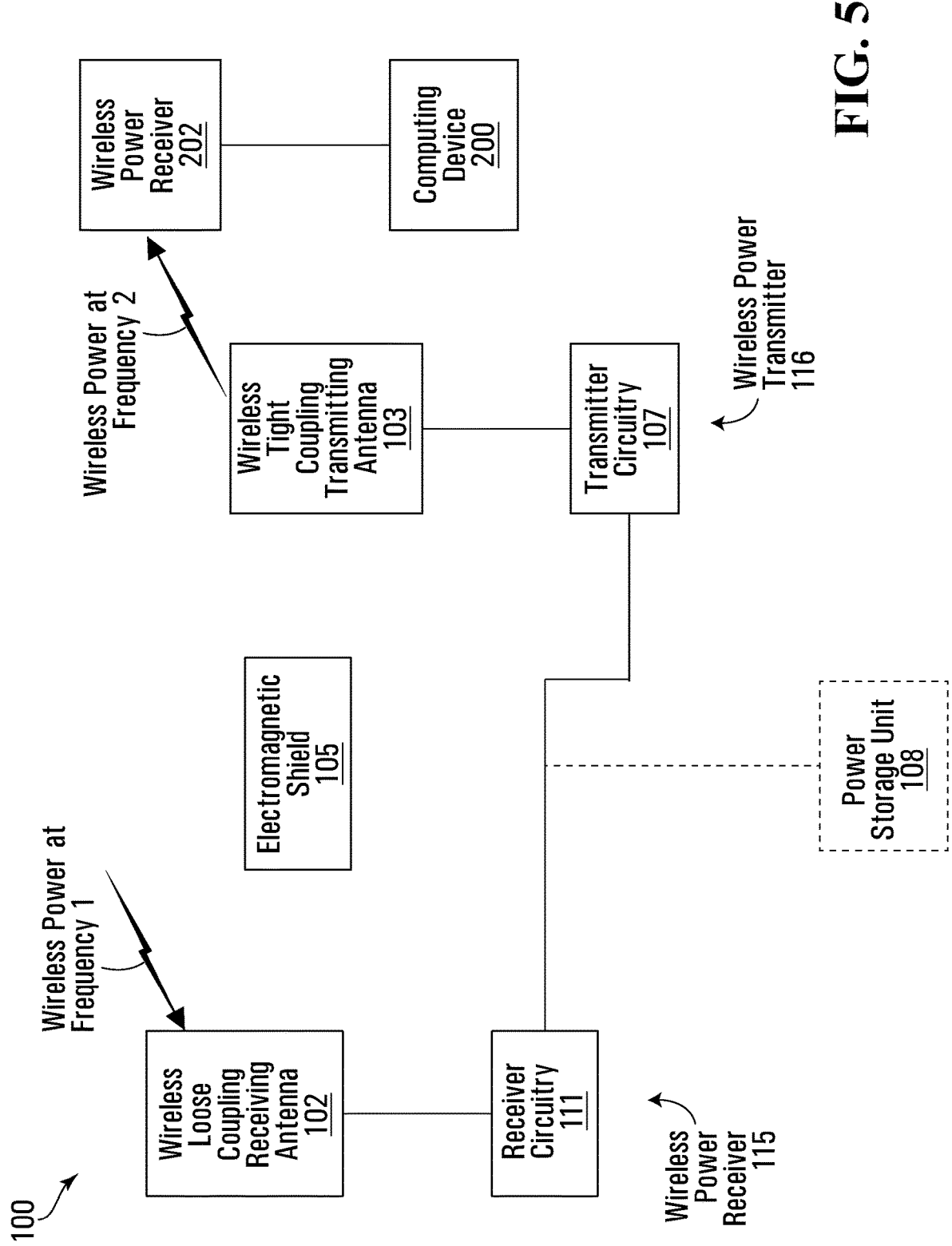
FIG. 5 is a block diagram of an exemplary wireless power adapter that transmits wireless power at a second frequency to a wireless power receiver of the computing device.

As shown in FIG. 5, the wireless power transmitting antenna 103 of the wireless power adapter 100 transmits wireless power at a second frequency that may be received by the wireless power receiver 202 of the computing device 200. The wireless power receiver 202, for receiving wireless power at the second frequency, can then output power for powering the computing device 200.

The wireless power receiving antenna 102, the wireless power receiving antenna 109 and/or the wireless power transmitting antenna 103 may be made from reeled cables or wires, may be part of a printed circuit board, may be printed with conductive ink on a substrate, etc.

Figure 6A:
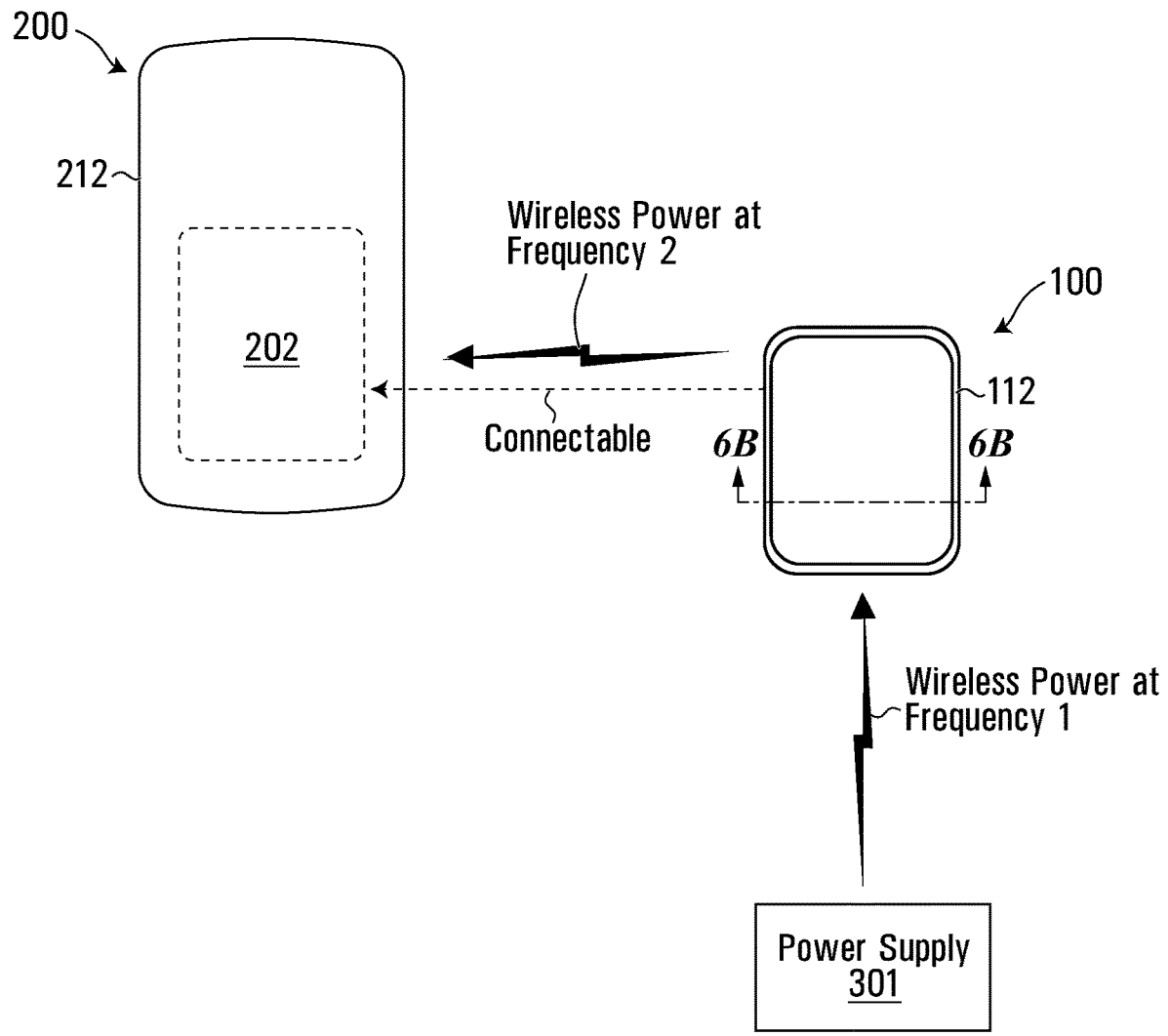
FIG. 6A is a schematic drawing of an exemplary system for powering a computing device with an exemplary wireless power adapter and an exemplary power supply.
Figure 6B:
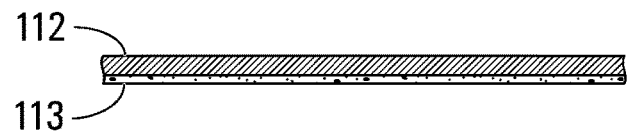
FIG. 6B is a schematic drawing of a cross-sectional view of an exemplary housing and connector of an exemplary wireless power adapter.

Positioning of the Adapter with Respect to the Computing Device:

Reference is now made to FIGS. 6A and 6B illustrating an exemplary wireless power adapter 100 having a housing 112 that is adapted to mate with the housing 212 of a computing device 200 requiring power. The housing 112 may be a thin plastic sleeve or casing, e.g., in which is found other components of the wireless power adapter 100. The wireless power adaptor 100 may have a connector 113 on at least part of the surface of the housing 112 for connecting the housing 112 to the housing of the computing device 200.

The housing 112 may be configured to mate with the housing 212 such that the wireless power adapter 100 (and its wireless power transmitting antenna 103) is placed in proximity or vis-à-vis the wireless power receiver 202 of the computing device 200. Such adjacent positioning between the wireless power transmitter 116 and the wireless power receiver 202 of the computing device 200 may be necessary when the wireless power at the second frequency corresponds to that of, for instance, the QI standard (e.g. capable of transmitting over short distances, and where improper positioning may reduce the efficiency of the wireless power transfer), employing a tightly coupled solution. As such, when the computing device 200, now mated with the wireless power adapter 100, is placed on, e.g., a wireless power station that employs loose coupling technology, the computing device 200 may be powered as a result of it mating with the wireless power adapter 100.

Once the housing 112 of the wireless power adapter 100 has mated with the housing 212 of the computing device 200, when the wireless power at the first frequency is transmitted by the power supply 301 producing the wireless power at the first frequency, the wireless power adapter 100 (e.g. placed in proximity to the power supply 301, or positioned as needed to receive the wireless power at the first frequency) may receive the wireless power at the first frequency, and may transmit wireless power at the second frequency. The wireless power receiver 202 of the computing device 200, in proximity to the wireless power adapter 100, receives the wireless power at the second frequency, and outputs power to the computing device 200.

It will be understood that in some examples, the wireless power adapter 100 does not mate with the computing device 200. For instance, the wireless power adapter 100 (e.g. in the form of a pad, integrated to a table or desk, etc.) may be adapted to be placed on, or within a work station (e.g. a table, a desk), on which a computing device may be placed that requires power. Once in proximity to the computing device 200, the wireless power adapter 100 may provide power to the computing device 200 placed in proximity thereto. In some examples, the wireless power adapter 100 may be fixed to the work station, or under the work station (e.g. under the desk, under the table), with e.g., an indicator as to where to place the computing device 200 for charging.

In other examples, the housing 112 of the wireless power adaptor 100 may be configured to mate with the casing of a computing device 200.

Figure 6C:
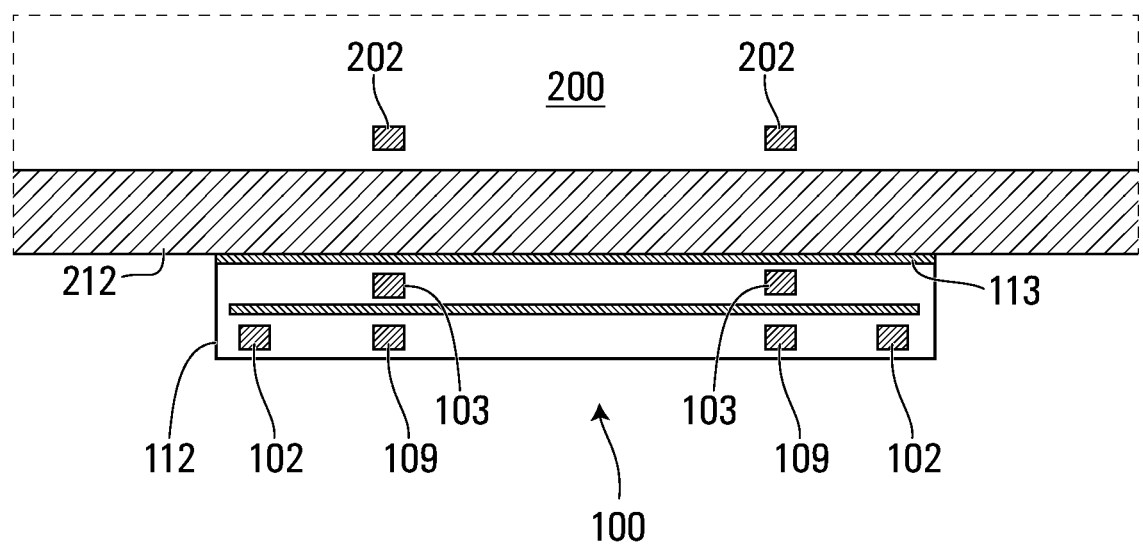
FIG. 6C is a schematic drawing of a cross-sectional view of an exemplary wireless power adapter mounted to the housing of a computing device having an exemplary wireless power receiver.

Reference is now made to FIG. 6C, illustrating a cross-sectional view of an exemplary wireless power adapter 100 mounted to the housing 212 of an exemplary computing device 200. The computing device 200 has a wireless power receiver 202. In some embodiments, the wireless power receiver 202 is a tightly coupled wireless power receiver (e.g. inductive wireless power receiver) adapted to receive the wireless power at a frequency, for instance, corresponding to the QI standard.

The wireless power adapter 100 may have, on its housing 112, a connector 113 that connects the housing 112 of the wireless power adapter 100 to the housing 212 of the computing device 200. In some examples, the connector 113 may be an adhesive or a material that creates suction, resulting in the wireless power adapter 100 adhering to the housing 212 of the computing device 200.

In some examples, the wireless power transmitting antenna 103 of the wireless power adapter 100 may be shaped such that it matches or shadows the shape, dimensions and/or position of the wireless power receiver 202 of the computing device 200. Such may be desirable when, for example, the wireless power receiver 202 of the computing device 200 is sensitive to wireless power corresponding to the QI standard (and wireless power at that standard is transmitted by the wireless power transmitter 116), or employs a tight coupling solution, where the positioning of the transmitting and the receiving coils in proximity may be important for optimizing efficiency of the transfer of the wireless power.

The wireless power adapter 100 may also have, in some examples, a tight coupling wireless power receiver antenna 109 and a loose coupling wireless power receiving antenna 102, the wireless power adapter 100 capable of receiving wireless power at two different frequencies (e.g. a frequency corresponding to the AirFuel™ standard, and a frequency corresponding to the QI standard). In some examples, the wireless power receiving antenna 109 may be shaped such that it shadows or is similar to the dimensions and position of the tight coupling wireless power transmitting antenna 103 (e.g. where the wireless power received by the wireless power receiving antenna 109 and transmitted by the wireless power transmitting antenna 103 corresponds to the QI standard).

In some examples, the wireless power adapter 100 may be shaped to be as thin as a card, where it may be shaped to slip between the computing device 200 and the casing of the computing device 200. In some examples, in order for the wireless power adapter 100 to achieve such a thinness, the wireless power receiver 115 (and, in some examples, the wireless power receiver 117) may be mounted to a circuit board or a planar medium as shown in FIG. 4.

Figure 6D:
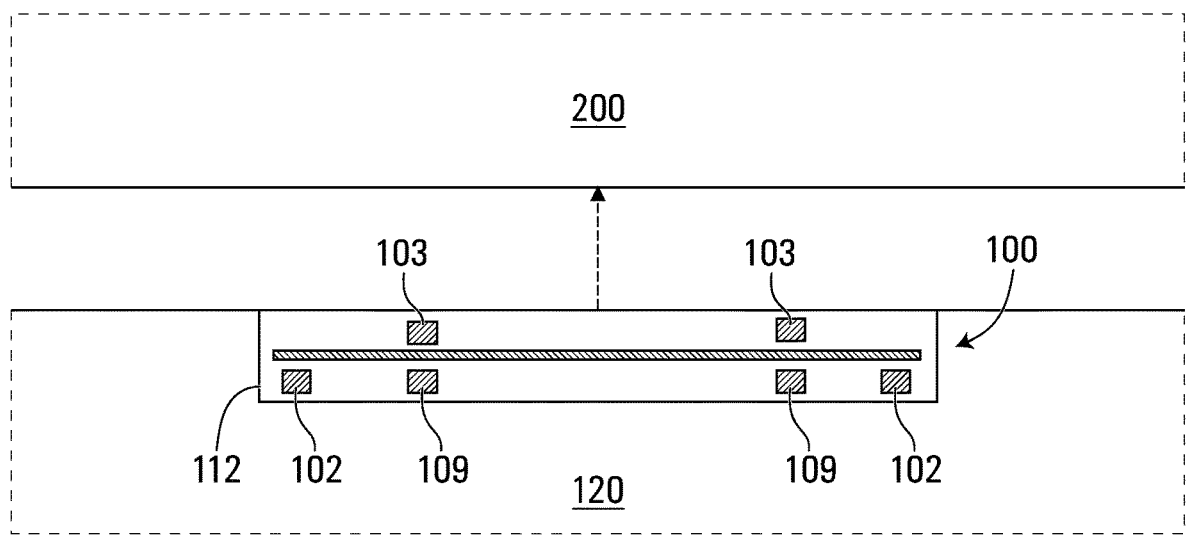
FIG. 6D is a schematic drawing of a cross-sectional view of an exemplary wireless power adapter integrated into a case for a computing device.

As shown in FIG. 6D, the wireless power adapter 100 may also be integrated into a case 120 for receiving a computing device 200 (e.g. a tablet, a smartphone, etc.) In some examples, the wireless power adapter 100 may be imbedded in the case 120. In some examples, an inner surface of the case 120, the inner surface shaped to come into contact and mate with the housing of the computing device 200, may provide for a receptacle to receive the wireless power adapter 100. In some examples, the case 120 may also serve as the housing 112 for the other components of the wireless power adapter 100. In other examples, there may be a housing 112 for further receiving and enclosing the other components of the wireless power adapter 100.

Figure 7:
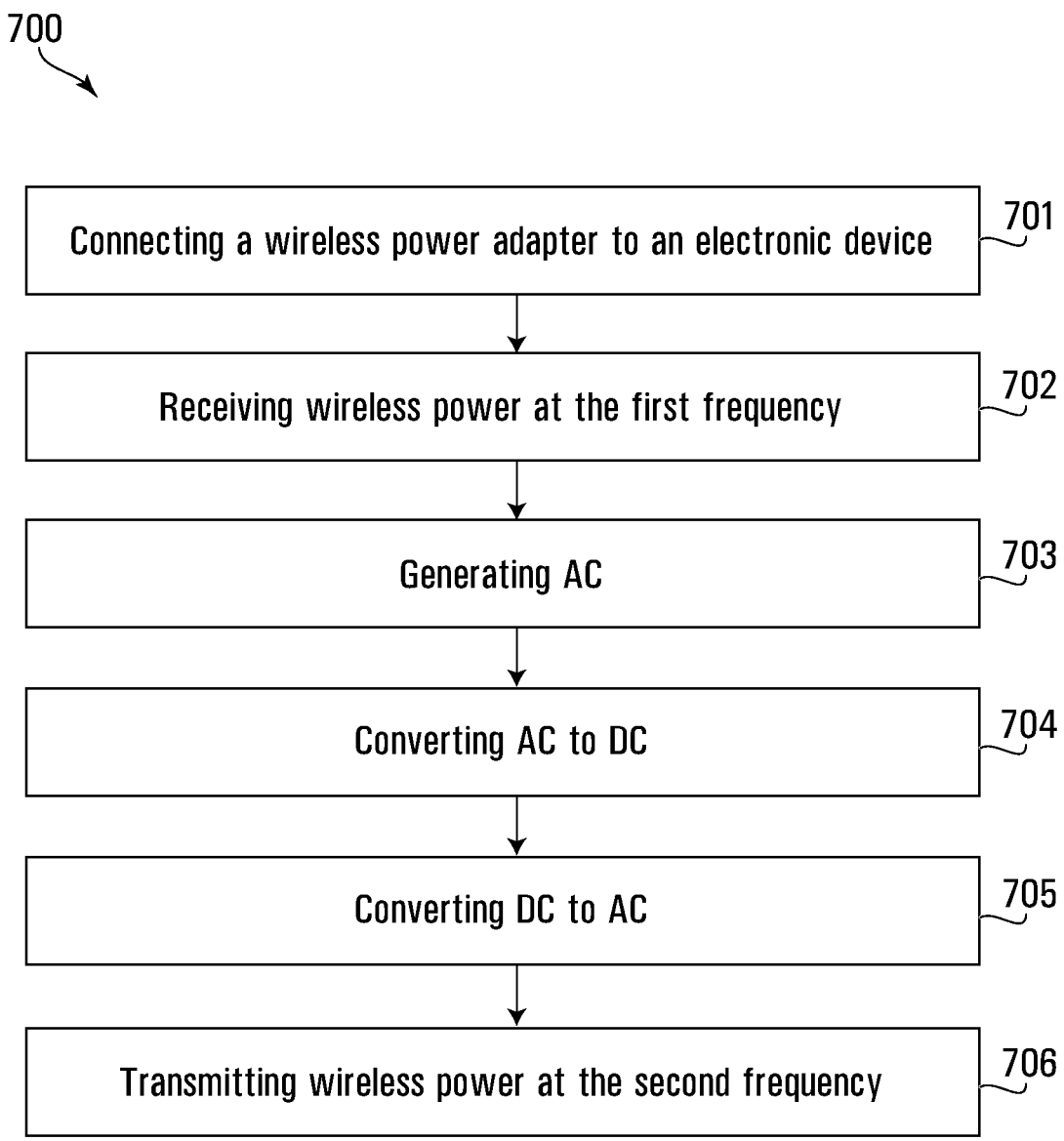
FIG. 7 is a flowchart diagram of an exemplary method of receiving wireless power at a first frequency and transmitting wireless power at a second frequency for powering an electronic device receptive to the wireless power at the second frequency.

Method of Receiving Wireless Power at a First Frequency and Transmitting Wireless Power at a Second Frequency:

Reference is now made to FIG. 7, illustrating an exemplary method 700 of receiving wireless power at a first frequency and transmitting wireless power at a second frequency to a device receptive to wireless power at the second frequency.

The wireless power adapter 100 may first be connected to the computing device 200 at step 701. For instance, the housing 112 of the wireless power adapter 100 may mate with the housing 212 of the computing device 200, where the connector 113 of the wireless power adaptor 100 connects the wireless power adapter 100 (and its housing 112) to the housing 212 of the computing device 200. In some examples, the wireless power adapter 100 may be connected to the computing device 200 using an adhesive, suction, etc.

The wireless power adapter 100 then receives at its wireless power receiver 115 wireless power at a first frequency at step 702. The wireless power may be generated, for instance, by an external power supply with a wireless power transmitter (e.g. a wireless power transmitter connected to mains power). The wireless power transmitter that generates the wireless power at the first frequency may be configured to generate the wireless power at a frequency corresponding to the AirFuel™ wireless power transfer standard. The wireless power transmitted that generates the wireless power at the first frequency may employ a loose coupling solution. In some embodiments, the wireless power receiver 115 is adapted to receive the wireless power at the first frequency through resonance.

The wireless power receiver 115 may then output direct current power. In some examples, the wireless power receiving antenna 102 of the wireless power adapter 100 may output alternating current at step 703 from the wireless power that has been received.

The alternating current may then be converted to direct current at step 704, by the receiver circuitry 111.

The direct current may then be converted to alternating current at a specific frequency at step 705, where the specific frequency may depend upon the desired frequency at which the wireless power is to be transmitted. The conversion from direct current to alternating current may be achieved by the transmitter circuitry 107.

It will be understood that in some examples where the wireless power receiving antenna receives wireless power at the same frequency as that of the wireless power transmitted by the wireless power transmitting antenna 103 (e.g. some embodiments of the wireless power receiving antenna 109), the wireless power receiver does not need circuitry for converting the alternating current to direct current, and the direct current does not need to be reconverted back to alternating current (in a different frequency) by the transmitter circuitry. In these examples, such as with the wireless power receiving antenna 109, the alternating current produced by the power receiving antenna 109 may be sent directly as alternating current to the wireless power transmitting antenna 103.

In some examples, the wireless power receiver 115 may transmit power to a power storage unit 108. The wireless power transmitter 116 may, in some examples, also receive power from a power storage unit 108.

The wireless power transmitter 116 then transmits wireless power at the second frequency at step 706, where the second frequency of the wireless power may be as a function of the specific frequency of the alternating current. For instance, the wireless power may be transmitted at a frequency corresponding to that of the QI wireless power standard. In some examples, the wireless power may be transmitted using a tight coupling solution (e.g. inductively).

The wireless power at the second frequency is then received by the wireless power receiver 202 of the computing device 200, the wireless power receiver 202 receptive to wireless power at the second frequency. The computing device 200 may then be powered, as a result of the wireless power at the second frequency received by its wireless power receiver 202. For instance, if the wireless power receiver 202 of the computing device 200 is receptive to wireless power corresponding to the QI standard but not the AirFuel™ standard, the wireless power adapter 100 permits the conversion of the wireless power originally transmitted wirelessly by the power source in accordance to the AirFuel™ standard, to the QI standard such that the computing device's wireless power receiving components may ultimately be powered by the wireless power generated in accordance with the the AirFuel™ standard, despite the difference of standards and the limitations of the wireless power hardware/software of the computing device 200.

It will be understood that the wireless power adapter as described herein, and its components, may be adapted to receive wireless power at a first frequency, following any known mechanism of wireless power transfer, and transmitting wireless at a second frequency following any known mechanism of wireless power transfer. Such a mechanism may be, but is not limited to, resonance (e.g. A4WP), induction (e.g. QI; PMA), RF (e.g. Energeous; WattUp®), ultra sound (e.g. uBeam), laser, microwave, etc.

Propagation Form Wireless Power Adapter:

In some embodiments, the wireless power adapter may be further adapted to receive wireless power in one propagation form and to transmit wireless power in a second propagation form. In these embodiments, the wireless power received by the wireless power adapter may be in the same frequency, or in a different frequency, from the frequency of the wireless power that is transmitted by the wireless power adapter.

Figure 8:
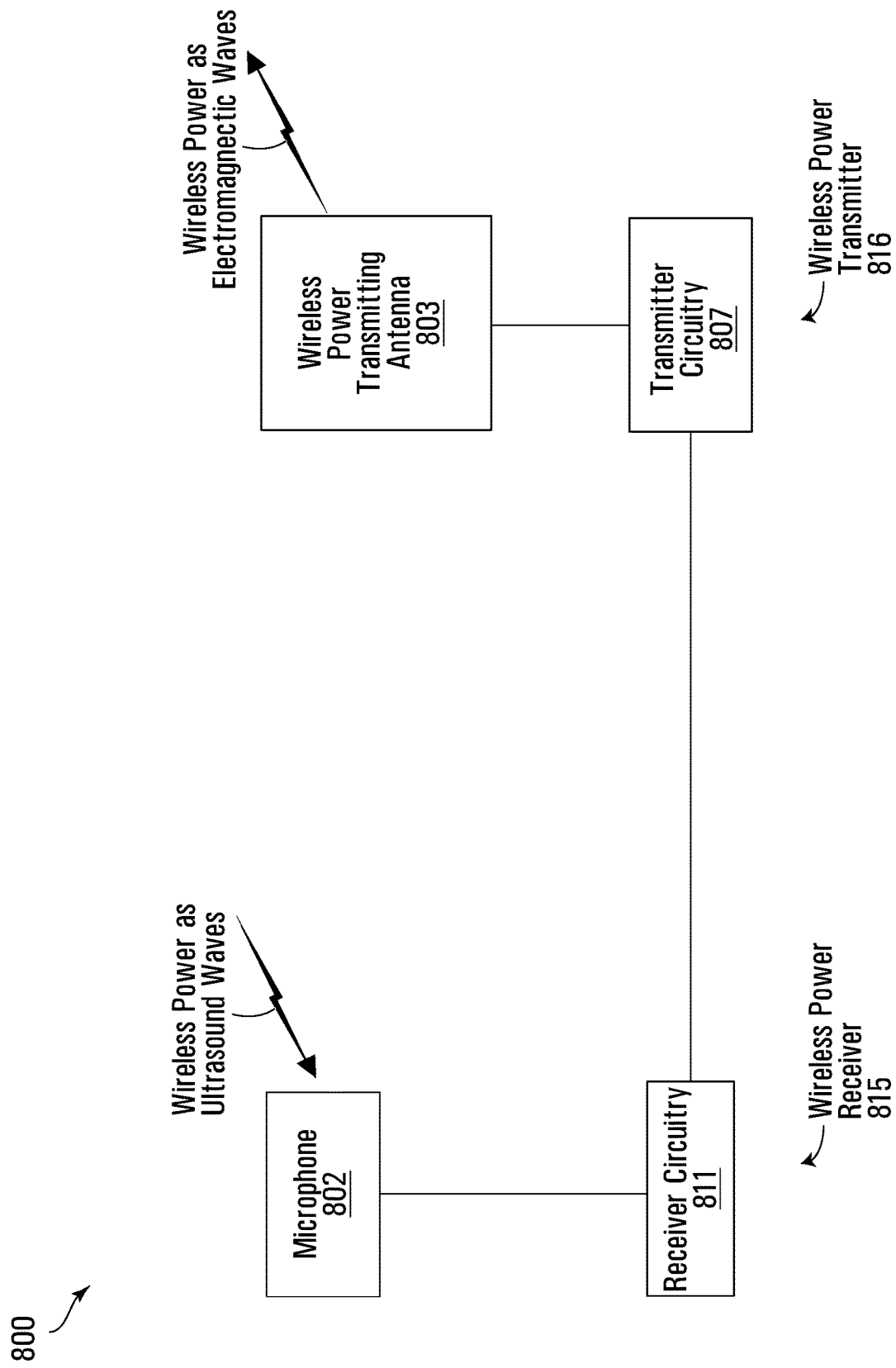
FIG. 8 is a block diagram of an exemplary wireless power adapter for receiving wireless power in a first propagation form and transmitting wireless power in a second propagation form.

Reference is made to FIG. 8, illustrating an exemplary propagation form wireless power adapter 800. Even though the wireless power adapter 800, as shown in FIG. 8, is adapted to receive wireless power in ultrasound, and transmit the wireless power using electromagnetic waves, it will be understood that the wireless power adapter 800 may receive wireless power in a propagation form other than ultrasound (e.g. electromagnetic waves, etc.) and transmit wireless power in a propagation form other than electromagnetic waves (e.g. ultrasound, etc.) without departing from the present teachings.

In the example of FIG. 800, a microphone 802 of the wireless power receiver 815 receives the wireless power in the ultrasound propagation form. An alternating current may then be produced by the microphone 802.

When the received wireless power and the transmitted wireless power are of the same frequency, the receiver circuitry 811 may not need to convert the alternating current into direct current. Similarly, when the received wireless power and the transmitted wireless power are of the same frequency, the transmitter circuitry 807 of the wireless power transmitter 816 may not need to then convert the direct current back into alternating current for generating wireless power at the frequency of the wireless power transmitter 803 (this switch from AC to DC, then DC to AC, is performed when the frequency of the received wireless power is different from the frequency of the transmitted wireless power). The alternating current may travel from the wireless power receiver 815 to the wireless power transmitter 816 (without conversion to direct current).

The wireless power transmitting antenna 803 of the wireless power transmitter 816 then transmits the wireless power in the second propagation form (in the example of FIG. 8, as electromagnetic waves).

Wireless Power Adapter—Change of Standard:

The wireless power adapter may be adapted to receive wireless power corresponding to a first interface standard and transmit wireless power corresponding to a second interface standard. In some examples, the frequency of the wireless power and/or the propagation form may be the same or similar between the received wireless power and the transmitted wireless power. In these examples, it may only be the communication protocol that varies between reception and transmission. In other examples, more than one characteristic of the interface standard may vary between reception and transmission of the wireless power (e.g. such as the frequency of the wireless power and/or the propagation form of the wireless power).

It will be understood that when the received wireless power and the transmitted wireless power are of the same frequency, there may be no need to convert the alternating current produced by the wireless receiver to direct current, then the direct current back into alternating current (this switch from AC to DC, then DC to AC, is performed when the frequency of the received wireless power is different from the frequency of the transmitted wireless power).

As such, the wireless power adapter of the present disclosure receives wireless power corresponding to a first interface standard and transmits wireless power corresponding to a second interface standard. The difference(s) between the first interface standard and the second interface standard may be, but not limited to, frequency of the wireless power, propagation form of the wireless power, communication protocol of the wireless power, etc.

The description of the present invention has been presented for purposes of illustration but is not intended to be exhaustive or limited to the disclosed embodiments. Many modifications and variations will be apparent to those of ordinary skill in the art.

What is claimed is:

1. A wireless power adapter comprising:
   a loosely coupled wireless power receiver adapted to receive wireless power at a first frequency and for providing a direct current power output;
   a tightly coupled wireless power transmitter connected to said direct current power output and adapted to transmit wireless power at a second frequency once direct current power is provided by said loosely coupled wireless power receiver; and
   an electromagnetic shield adapted to reduce interference between said loosely coupled wireless power receiver and said tightly coupled wireless power transmitter,
   wherein said electromagnetic shield is positioned between said loosely coupled wireless power receiver and said tightly coupled wireless power transmitter such that the loosely coupled wireless power receiver and the tightly coupled wireless power transmitter sandwiches the electromagnetic shield therein between for reducing the thickness of the wireless power adapter, where the electromagnetic shield is planar and parallel with the loosely coupled wireless power receiver and the tightly coupled wireless power transmitter.

2. The adapter as defined in claim 1, further comprising:
   a tightly coupled wireless power receiver adapted to receive wireless power at said second frequency and for providing an additional current power output;
   wherein said tightly coupled wireless power transmitter is further adapted to receive current power from said loosely coupled wireless power receiver and said tightly coupled wireless power receiver; and
   wherein said electromagnetic shield is further adapted to reduce interference between said tightly coupled wireless power receiver and said tightly coupled wireless power transmitter.

3. The adapter as defined in claim 2, said electromagnetic shield comprising:
   a first sub-shield adapted to reduce interference between said loosely coupled wireless power receiver and said tightly coupled wireless power transmitter; and
   a second sub-shield adapted to reduce interference between said tightly coupled wireless power receiver and said tightly coupled wireless power transmitter.

4. The adapter as defined in claim 2, wherein said tightly coupled wireless power receiver is an inductive wireless power receiver.

5. The adapter as defined in claim 1, wherein said tightly coupled wireless power transmitter and said loosely coupled wireless power receiver are printed on a circuit board.

6. The adapter as defined in claim 5, further comprising electromagnetic filter components mounted on said circuit board, and electrically connected to said wireless power adapter, to reduce electromagnetic interference between the loosely coupled wireless power receiver and the tightly coupled wireless power transmitter.

7. The adapter as defined in claim 1, further comprising:
a power storage unit connected to at least said loosely coupled wireless power receiver for receiving power from at least said loosely coupled wireless power receiver, and connected to said tightly coupled wireless power transmitter for delivering power to said tightly coupled wireless power transmitter.

8. The adapter as defined in claim 7, wherein said power storage unit is configured to receive current in parallel with said tightly coupled wireless power transmitter, said current provided by at least said loosely coupled wireless power receiver.

9. The adapter as defined in claim 7, wherein said power storage unit is a battery.

10. The adapter as defined in claim 1, further comprising a housing for receiving at least said loosely coupled wireless power receiver and said tightly coupled wireless power transmitter.

11. The adapter as defined in claim 10, said housing comprising a connector for attaching said housing to a surface of a computing device.

12. The adapter as defined in claim 11, wherein said connector is at least one of a clip, an adhesive, an electromagnet and a magnet.

13. The adapter as defined in claim 1, wherein said adapter is incorporated into a casing for receiving a computing device.

14. A combination comprising a computing device and the wireless power adapter as defined in claim 10, wherein said computing device comprises:
a computing device housing; and
a tightly coupled wireless power receiver for receiving wireless power at a second frequency and outputting current for powering said computing device;
wherein said housing of said wireless power adapter is adapted to mate with said housing of said computing device.

15. A method of adapting a computing device, said computing device comprising a tightly coupled wireless power receiver adapted to receive wireless power at a second frequency via a tight coupling, to be powered by wireless power received at a first frequency, comprising:
connecting a wireless power adapter to a surface of a housing of said computing device, said wireless power adapter comprising:
a housing
a loosely coupled wireless power receiver adapted to receive wireless power at said first frequency and for providing a direct current power output;
a tightly coupled wireless power transmitter connected to said direct current power output and adapted to transmit wireless power at said second frequency once direct current power is provided by at least said loosely coupled wireless power receiver; and
an electromagnetic shield adapted to reduce interference between said loosely coupled wireless power receiver and said tightly coupled wireless power transmitter,
wherein said electromagnetic shield is positioned between said loosely coupled wireless power receiver and said tightly coupled wireless power transmitter such that the loosely coupled wireless power receiver and the tightly coupled wireless power transmitter sandwiches the electromagnetic shield therein between for reducing the thickness of the wireless power adapter, where the electromagnetic shield is planar and parallel with the loosely coupled wireless power receiver and the tightly coupled wireless power transmitter, and
wherein said housing of said wireless power adapter is connected to said surface of said housing of said computing device such that said tightly coupled wireless power transmitter of said wireless power adapter is in proximity to said tightly coupled wireless power receiver of said computing device.

16. A wireless power adapter comprising:
a wireless power receiver adapted to receive wireless power corresponding to a first interface standard for providing a current power output;
a wireless power transmitter connected to said current power output and adapted to transmit wireless power corresponding to a second interface standard once current power is provided by said wireless power receiver; and
an electromagnetic shield adapted to reduce interference between said wireless power receiver and said wireless power transmitter,
wherein said electromagnetic shield is positioned between said wireless power receiver and said wireless power transmitter such that the loosely coupled wireless power receiver and the tightly coupled wireless power transmitter sandwiches the electromagnetic shield therein between for reducing the thickness of the wireless power adapter, where the electromagnetic shield is planar and parallel with the loosely coupled wireless power receiver and the tightly coupled wireless power transmitter.

17. The wireless power adapter as defined in claim 16, wherein said wireless power receiver is a loosely coupled wireless power receiver and provides direct current power output, and said wireless power transmitter is a tightly coupled wireless power transmitter and is connected to said direct current power output, and wherein said first interface standard is associated to wireless power at a first frequency and said second interface standard is associated to wireless power at a second frequency.

18. The wireless power adapter as defined in claim 16, wherein at least one of:
said first interface standard corresponds to wireless power in a first propagation form and said second interface standard corresponds to wireless power transmitted in a second propagation form; and
said first interface standard corresponds to a first communication protocol and said second interface standard corresponds to a second communication protocol.

* * * * *